United States Patent
Chen et al.

(10) Patent No.: US 8,700,817 B2
(45) Date of Patent: Apr. 15, 2014

(54) DETECTION DEVICE

(75) Inventors: Peng Chen, Shenzhen (CN); Qi-Yan Luo, Shenzhen (CN); Song-Lin Tong, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 177 days.

(21) Appl. No.: 13/329,224

(22) Filed: Dec. 17, 2011

(65) Prior Publication Data

US 2013/0031280 A1    Jan. 31, 2013

(30) Foreign Application Priority Data

Jul. 29, 2011   (CN) .......................... 2011 1 0215688

(51) Int. Cl.
*G06F 3/00*     (2006.01)
(52) U.S. Cl.
USPC ...................... 710/18; 710/15; 710/19; 714/1
(58) Field of Classification Search
None
See application file for complete search history.

(56) References Cited

U.S. PATENT DOCUMENTS

| | | | | |
|---|---|---|---|---|
| 5,339,446 A * | 8/1994 | Yamasaki et al. | ............ | 713/340 |
| 5,811,890 A * | 9/1998 | Hamamoto | ................... | 307/66 |
| 6,074,775 A * | 6/2000 | Gartstein et al. | ............... | 429/53 |
| 6,184,660 B1 * | 2/2001 | Hatular | ......................... | 320/141 |
| 2004/0102228 A1 * | 5/2004 | Hakamata et al. | ............ | 455/572 |
| 2006/0145658 A1 * | 7/2006 | Wang | ............................. | 320/107 |
| 2012/0110218 A1 * | 5/2012 | Josefsson et al. | ............... | 710/18 |
| 2012/0299966 A1 * | 11/2012 | Kim et al. | .................... | 345/660 |

\* cited by examiner

*Primary Examiner* — Michael Sun
(74) *Attorney, Agent, or Firm* — Altis Law Group, Inc.

(57) ABSTRACT

A detection device to detect a power serving time of a super capacitor for a power-disconnected storage card and an amount of the data packets capable of being stored during the detected serving time is provided. The power-disconnected storage card includes a memory. The detection device includes a power supply unit, the super capacitor, a controller, a storage unit, and a detection unit. The storage unit stores the data packets. The detection unit includes a charge notification module, a data notification module and a time module. The charge notification module generates a first notification signal to the time module. The data notification module generates a second notification signal to the time module when the storage unit transmits the data packet to the memory. The time module records time when the memory completely store the data packet according to the first notification signal and the second notification signal.

5 Claims, 1 Drawing Sheet

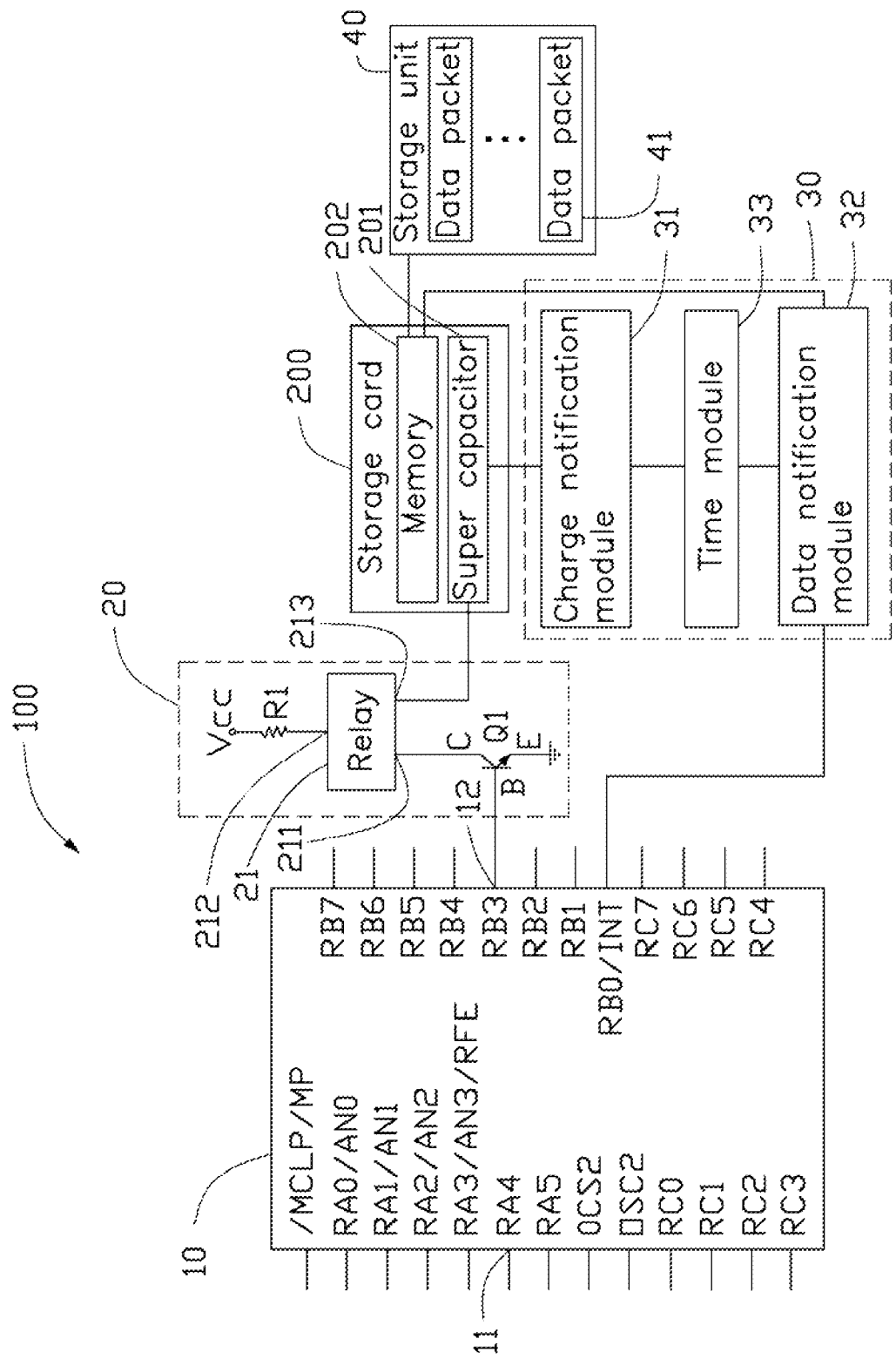

DETECTION DEVICE

BACKGROUND

1. Technical Field

The present disclosure relates to detection devices and, particularly, to a detection device for providing a serving time of a super capacitor for a power-disconnected storage card to store data packets, and an amount of the data packets can be stored in the power-disconnected storage card during the serving time.

2. Description of Related Art

In order to prevent data packets from being lost during a process of storing data to a power-disconnected storage card, a super capacitor is mounted in the storage card for providing power to the power-disconnected storage card. However, it is not clear how long the super capacitor can provide power for the power-disconnected storage card and how many data packets can be stored during the serving time provided by the super capacitor.

Therefore, what is needed is a detection device for providing a solution to overcome the described limitations.

BRIEF DESCRIPTION OF THE DRAWINGS

The components of the drawing are not necessarily drawn to scale, the emphasis instead being placed upon clearly illustrating the principles of a detection device.

The drawing is a block diagram of a detection device in accordance with an exemplary embodiment.

DETAILED DESCRIPTION

The drawing shows a detection device 100, which is configured to detect a serving time of a super capacitor 201 mounted in a power-disconnected storage card 200 for the power-disconnected storage card 200 to store data packets, and an amount of the data packets being stored in the power-disconnected storage card 200 during the detected serving time. The power-disconnected storage card 200 is a storage card 200 which is power-disconnected from a power supply. In one embodiment, the power-disconnected storage card 200 is solid-sate drive (SSD) card, which includes a memory 202. The detection device 100 includes a controller 10, a power supply 20, a detection unit 30, and a storage unit 40. The controller 10 includes an input pin 11 and an output pin 12.

The storage unit 40 stores a number of the data packets 41 with different data capacities, such as 50 M, 51 M ... 100 M, for example. The power-disconnected storage card 200 is connected to the storage unit 40. The memory 202 stores the data packets from the storage unit 40.

The power supply 20 includes a switch tube Q1, a relay 21, and a supply source Vcc. The relay 21 includes a first control terminal 211, a first input terminal 212, and a first output terminal 213. In one embodiment, the switch tube Q1 is NPN type audion. The switch tube Q1 includes a base electrode B, an emitter electrode E, and a collector electrode C. The base electrode B is electrically connected to the input pin 11 of the controller 10, the emitter electrode E is electrically connected to the earth, and the collector electrode C is electrically connected to first control terminal 211 of the relay 21. The first input terminal 212 of the relay 21 is electrically connected to the power source Vcc by a resistor R1. The first output terminal 213 is electrically connected to the super capacitor 201 of the storage card 200. An input terminal (not labeled) of the charge notification module 31 is connected to the first output terminal 213 of the relay 21, and an output terminal (not labeled) of the charge notification module 31 is connected to the time module 33. Two input terminals (not labeled) of the data notification module 32 are respectively connected to the memory 202 and the input pin 11 of the controller 10.

The first output terminal 213 of the relay 21 does not output current when the super capacitor 201 is completely charged. When the first output terminal 213 of the relay 21 does not output current, the charge notification module 31 generates a first notification signal to the time module 33 to indicate that the super capacitor 201 is completely charged. The data notification module 32 generates a second notification signal to the time module 33 when the storage unit 40 transmits the data to the memory 202. The time module 33 records the time according to the first notification signal and the second notification signal. In one embodiment, the time module 33 is a timer.

When detecting, that the output pin 12 of the controller 10 outputs a high voltage level to control the relay 21 to work, the power source Vcc charges for the super capacitor 201 by the first output terminal 213. The first output terminal 213 of the relay 21 does not output current when the super capacitor 201 is completely charged. The charge notification module 31 generates the first notification signal to the time module 33 to indicate that the super capacitor 201 is completely charged when the first output terminal 213 of the relay 21 does not output current. Then, the storage unit 40 transmits a 50 M data packet 41 to the memory 202 of the power-disconnected storage card 200, and the data notification module 32 generates the second notification signal to the input pin 11 of the controller 10. The output pin 12 of the controller 10 outputs a lower voltage level to disconnect the relay 21, the super capacitor 201 starts to discharge to supply power for the power-disconnected storage card 200 to store the 50 M data packet 41, and the time module 33 starts to record a storage time for the memory 202 to store the 50 M data packet 41. If the storage time is less than a discharge time of the super capacitor 201, it means that the memory 202 can completely store the 50 M data packet 41 within the discharge time. Then, the time module 33 resets the storage time as zero, and the output pin 12 of the controller 10 outputs a high voltage level again. In addition, repeats the above steps to detect whether a storage time for the memory 202 to store the 51 M data packet 41 is less than the discharge time of the super capacitor 201, if yes, it means that the memory 202 can completely store the 51 M data packet 41 within the discharge time. Repeating the above steps to detect whether a storage time for the memory 202 to store the 99 M data packet 41 is less than the discharge time of the super capacitor 201, if not, it means that the memory 202 cannot completely store the 99 M data packet 41 within the discharge time. The time module 33 records the storage time when the memory 202 can completely store the 51 M data packet 41 as the server time of the super capacitor 201. The amount of the data packet 41 being stored in the memory 202 is 51 M during the server time of the super capacitor 201.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. A detection device configured to detect a serving time of a super capacitor mounted in a power-disconnected storage card for the power-disconnected storage card to store data packets and an amount of the data packets configured for being stored during the serving time, the power-disconnected storage card comprising a memory, and the detection device comprising:

a power supply unit connected to the super capacitor, wherein the power supply unit comprises a switch tube, a relay and a power source, the relay comprises a first control terminal, an input terminal and an output terminal, the switch tube comprises a base electrode electrically connected to the input pin of the controller, an emitter electrode electrically connected to the ground, and a collector electrode electrically connected to first control terminal, and the relay is electrically connected to the power source and the super capacitor of the power-disconnected storage card;

a controller connected to the power supply unit, and configured to control the power supply unit to charge the super capacitor, wherein comprises an input pin and an output pin;

a storage unit configured to store a plurality of the data packets; and a detection unit comprising a charge notification module, a data notification module and a time module, wherein the charge notification module is configured to generate a first notification signal to the time module when the super capacitor is completely charged, the data notification module is configured to generate a second notification signal to the time module when the storage unit transmits the data packet the memory, and the time module is configured to record time when the memory starts to store the data packet from the storage unit and until that the data packet is completely stored in the memory from the storage unit as the serving time of a super capacitor according to the first notification signal and the second notification signal.

2. The detection device as described in claim 1, wherein the switch tube is a NPN type audion.

3. The detection device as described in claim 1, wherein the first input terminal of the relay is electronically connected to the power source by a resistor.

4. The detection device as described in claim 1, wherein the output pin of the controller is configured to output a high level to control the relay to work, and the power source charges for the super capacitor by the first output terminal of the relay.

5. The detection device as described in claim 1, wherein the first output terminal does not output current when the super capacitor is completely charged, and the charge notification module generates the first notification signal to the time module when the first output terminal does not output current.

* * * * *